Figure 1:
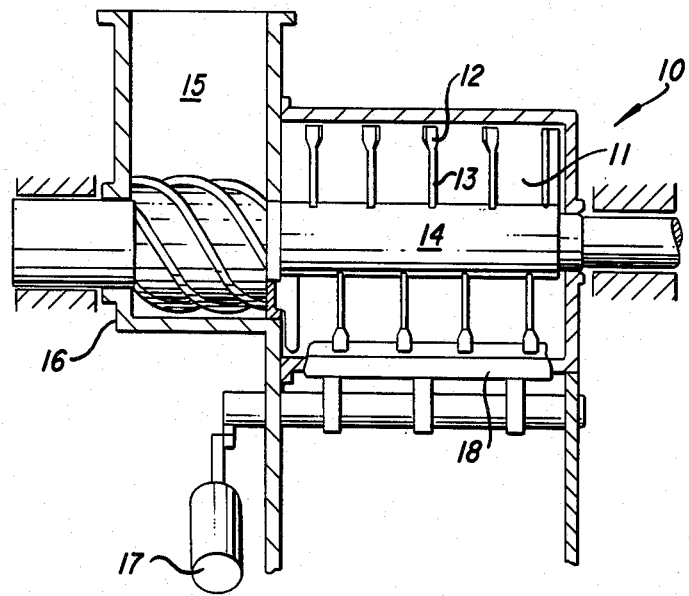

United States Patent [19]

Gupta et al.

[11] Patent Number: 4,789,597
[45] Date of Patent: Dec. 6, 1988

[54] INCORPORATION OF CHEMICALLY REACTIVE AGENTS ON RESIN PARTICLES

[75] Inventors: Ved Gupta, Ville LaSalle, Canada; Jerome E. Hager, Pompano Beach, Fla.; Ralph A. Noble, Ontario, Canada

[73] Assignee: Fetherstonhaugh & Co., Dorval, Canada

[21] Appl. No.: 2,207

[22] Filed: Jan. 12, 1987

[51] Int. Cl.$^4$ .................. B05D 7/00; B29D 27/04; B32B 5/16
[52] U.S. Cl. .................. 428/467; 764/54; 764/68; 427/222
[58] Field of Search .................. 241/93; 264/54, 68, 264/DIG. 5, DIG. 60; 366/77; 425/200, 817 R; 427/222; 521/53; 428/407

[56] References Cited

U.S. PATENT DOCUMENTS

| | | | |
|---|---|---|---|
| 3,229,002 | 1/1966 | Feder | 264/15 |
| 3,632,369 | 1/1972 | Hahn | 117/16 |
| 3,736,173 | 5/1973 | Okada et al. | 117/100 C |
| 3,997,494 | 12/1976 | Lever et al. | 260/42.42 |
| 4,142,804 | 3/1979 | Crocker | 366/77 |
| 4,230,615 | 10/1980 | Crocker et al. | 260/34.2 |
| 4,272,474 | 6/1981 | Crocker | 264/176 R |
| 4,407,987 | 10/1983 | Crocker et al. | 523/322 |
| 4,420,449 | 12/1983 | Crocker et al. | 264/68 |
| 4,448,738 | 5/1984 | Crocker | 264/54 |
| 4,508,859 | 4/1985 | Muhle et al. | 523/346 |
| 4,510,271 | 4/1985 | Muhle et al. | 523/346 |

Primary Examiner—Michael Lusignan
Attorney, Agent, or Firm—Larson and Taylor

[57] ABSTRACT

Chemically reactive agents may be locked to particles of suitable synthetic resins without wholly fluxing the resins. Thus a high quality intermediate product is obtained having no premature reaction taking place, suitable for further techniques. The process comprises the steps of intensively mixing and thermokinetically heating a batch of finely divided resin particles, with a chemically reactive agent, in an enclosed mixing chamber with a plurality of blades attached to arms rotating about a central axis within the chamber, and having a blade tip speed of at least about 18 meters per second, mixing the batch until the chemically reactive agent is locked to the resin particles, ensuring that temperature of the batch stays well below decomposition temperature of the reactive agent and below fluxing temperature of the resin particles, discharging the batch from the mixing chamber and cooling the discharged batch to avoid agglomeration of the resin particles.

9 Claims, 2 Drawing Sheets

INCORPORATION OF CHEMICALLY REACTIVE AGENTS ON RESIN PARTICLES

The present invention relates to the application of chemically reactive agents to suitable synthetic resins. More specifically, the present invention relates to a method of producing synthetic resin particles capable of being formed or molded into thermoplastic or thermosetting plastic products, with a chemically reactive agent locked to the resin particles.

Chemically reactive agents, such as cross linking agents and chemical foaming agents, are in current technology incorporated during the fluxing of synthetic resins. Examples of a cross linking agent used with certain synthetic resins are peroxides such as dicumyl peroxide sold by Hercules Inc. under the trade mark DI-CUP and highly active bisperoxide sold by Hercules Inc. under the trademark VUL-CUP. Examples of chemical foaming agents are blowing agents such as those sold under the trade mark CELOGEN. (Azodicarbonamide, Para, para-Oxy bis-(benzene sulfonhydrazide) and para-Toluene sulfonyl semicarbazide). Other chemically reactive agents include grafting agents which may be used with certain resins. In most cases, the chemical reaction occurs when the agent reaches a certain temperature and this should be above the fluxing temperature of the resin.

The type of synthetic resins referred to in the present invention include linear and branched low density polyethylene, medium density polyethylene, high density polyethylene and copolymers of polyethylene. Other suitable resins include polyvinyl chloride, polyvinyl chloride copolymers, polypropylene, polypropylene copolymers, polystyrene, acrylics, ethylene vinyl alcohol, high molecular weight waxes, Acrylonitrile-butadiene-styrene copolymers, polyvinylidene chloride, polyvinylidene chloride copolymers and suitable blends of the above.

Other ingredients such as stabilizers, lubricants, fillers and modifiers such as titanium dioxide can be added to the resin prior to the chemically reactive agents or at the same time as the reactive agents.

Most polymer resins occur naturally in powder, granule or flake form. Some resins occur naturally in pellet form. Powder is defined as having a particle size less than 200 mesh, granules have a particle size in the range of about 35 to 45 mesh and pellets are approximately ⅛ of an inch long. For the purposes of the present invention, it is preferred that the resin particles be in powder or granule or flake form. However, if they are in pellet form or are too large to have the reactive agents locked to the particles, these larger particles can be reduced in size by grinding. The term "Finely divided particles" as used throughout the specification and claims includes powder and flake and generally includes particles having a mesh size not greater than about 10.

In many prior art processes, the reactive agents are mixed with the resins in a mixer at a temperature where at least partial fluxing occurs. This is not so when foaming agents are incorporated with polyvinyl chloride powder. The mixing temperature, however, is kept below the reaction temperature of the agents. For most resins, whose natural or crude form is large or small particles, a compounder blends, fluxes and pelletizes the product and either ships the product from this operation in pellet form or grinds the product to powder before final processing into products. The final processing includes a second fluxing step and the reactive agents are activated at this time. Thus existing technology, with the exception of traditionally made PVC powder compounds in which no special attempt is made to lock the active ingredient to the PVC resin particles, requires two fluxing steps with a pelletizing and possibly a grinding step between. One purpose of the present invention is to produce a product with similar or improved properties by carrying out only one fluxing step.

It is an aim of the present invention to provide a process wherein chemically reactive agents are locked to the synthetic resin particles without wholly fluxing the resins. The term "lock" used throughout the specification is defined as firmly attaching the reactive agents to the resin particles so that they cannot be removed in normal material handling. Furthermore, it is an aim of the present invention to lock the chemically reactive agents to the synthetic resin particles keeping the temperature of the mix well below the decomposition temperature of the reactive agents. The present invention also aims to provide an intermediate resin product in particle form with chemically reactive agents locked to the surface of the particles. Thus the compounder is able to provide a product which has not been fluxed nor been heated to temperatures as high as existing products of this type.

The process avoids a fluxing step for the compounder so no premature reaction takes place and a high quality dispersion results. This reduces production costs because less energy is needed for the mixing step, and pelletizing or grinding is not needed.

The intermediate product sold by the compounder to the customer is suitable for injection molding, powder coating, rotational molding, extrusion, as well as other forming techniques.

The present invention provides a process for incorporating chemically reactive agents on suitable synthetic resins comprising the steps of: intensively mixing and thermokinetically heating a batch of finely divided resin particles, with a chemically reactive agent, in an enclosed mixing chamber with a plurality of blades attached to arms rotating about a central axis within the chamber, and having a blade tip speed of at least about 18 meters per second; mixing the batch until the chemically reactive agent is locked to the resin particles, ensuring that temperature of the batch stays well below decomposition temperature of the reactive agent and below fluxing temperature of the resin particles; discharging the batch from the mixing chamber; and cooling the discharged batch to avoid agglomeration of the resin particles.

In a preferred embodiment, the resin is a polyethylene or a polyethylene copolymer, and the temperature of the batch at discharge is below 105 degrees C. and the discharged batch is cooled in a ribbon blender or other suitable equipment. The chemically reactive agent in one embodiment is a cross linking agent and in a second embodiment is chemical foaming agent.

Figure 2:
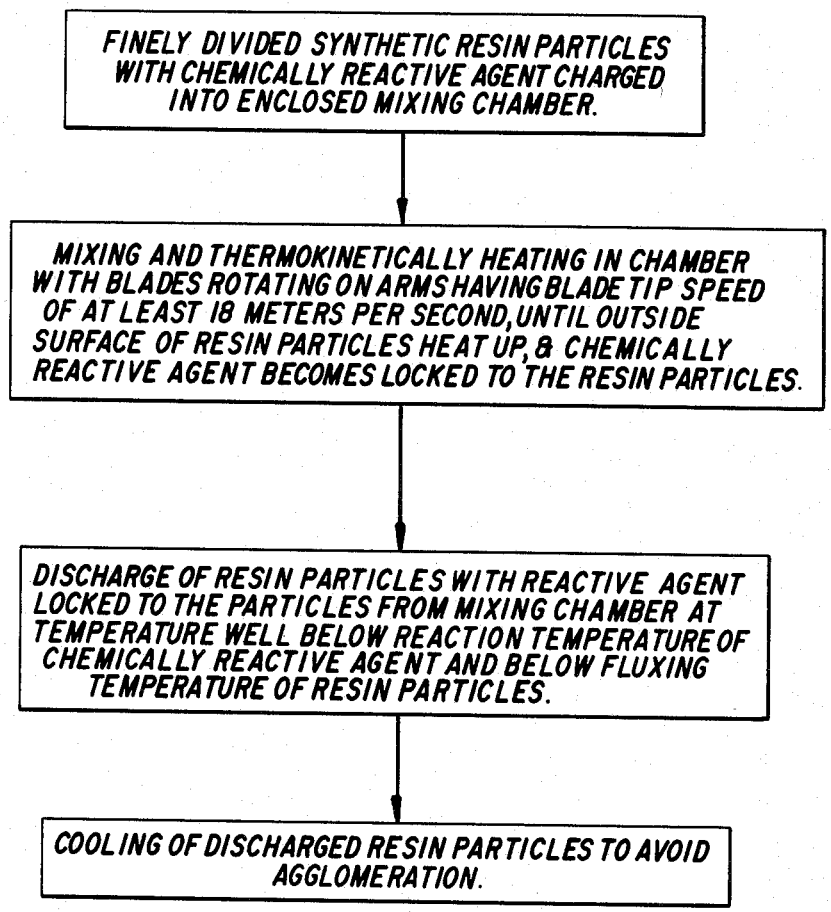

In drawings which illustrate embodiments of the invention:

FIG. 1 is a diagrammatic side elevational cross sectional view of a high intensity mixer described in Goeser U.S. Pat. No. 3,266,738;

FIG. 2 is a block diagram flow sheet of a method in accordance with the present invention.

The starting material for the process of the present invention is finely divided particles of resin. The synthetic resin particles are preferably in their natural occurring or crude form, however, for some materials whose crude form is in large particles, they must be broken down, otherwise there will not be sufficient surface area for acceptance of the available active ingredient when well dispersed. It is preferred to have particles having a mesh size not greater than about 10. The chemically reactive agent may initially be pre-blended with the resin particles prior to the intensive mixing step. If required, other ingredients may be added at the same time as the chemically reactive agent. A batch of resin particles and chemically reactive agent is charged into a high intensity mixer such as that disclosed by Goeser in U.S. Pat. No. 3,266,738. This patent describes a high intensity mixer which includes a plurality of blades rotating about an axis within an enclosed chamber. In U.S. Pat. No. 4,230,615, a system is provided for monitoring the batch temperature in a high intensity mixer separately from the mixer temperature, and then discharging the batch from the mixer when the batch temperature reaches a predetermined level.

Mixing is carried out in a high intensity mixer of the type shown in FIG. 1 wherein the mixer 10 includes an enclosed mixing chamber 11 with blades 12 rotating on arms 13 extending from shaft 14. Ingredients are introduced through a supply funnel 15 from where they are conveyed by worm 16, to the enclosed mixing chamber 11. A hydraulic cylinder 17 is provided to actuate discharge flap 18 for discharging the contents of the mixing chamber 11.

The shaft 14 is rotating at high speed to provide a tip speed for the blades 12 of at least eighteen meters per second, however, in other embodiments the tip speed may be as high as 45 meters per second. Higher tip speeds may be feasible in certain cases. The high tip speed intensively mixes and thermokinetically heats the resin particles in the chamber. The speed may be varied for different types of resins, and batch sizes. Two or more speeds may be used in one mixing step.

In a preferred embodiment, the temperature of the batch within the mixer is determined by measuring the infrared radiation directly from the batch so that the temperature of the batch is not affected by any temperature changes that occur in the body of the mixing chamber 11 or the mixing blades 12. The system of measurement is disclosed in U.S. Pat. No. 4,230,615. The temperature of the batch was set to control the instant of discharge. The temperature of discharge was set well below the decomposition temperature of the chemically reactive agent, and below the fluxing temperature of the resin particles. The high tip speed of the blades heats the surfaces of the resin particles as they are either hit by the blades or hit each other within the mixing chamber. The surfaces of the resin particles become somewhat soft. The agent sticks to and becomes locked onto the particles so the agent is no longer fugitive or mobile within the mixer. It is found that the agent is substantially uniformly distributed throughout the particles. The high speed of the rotating blades 12 within the chamber 11 causes the batch to heat up quickly, in the order of 10 seconds for some resins, thus the surface heat of the resin particles is not transmitted right through the particles and does not cause agglomeration of the particles. Upon discharge, some particles may stick together or have a tendency to stick together, particularly if the surfaces have melted, so a cooling step is immediately applied while the particles are more gently mixed to avoid agglomeration.

The method follows the sequence of steps set forth in FIG. 2, once the particles have the chemically reactive agent locked to the particles, then the mixer discharges the resin particles and these are subsequently cooled, preferably in a ribbon mixer to avoid agglomeration of the particles and to allow them to be stored without caking.

Tests were carried out with linear and branched low density polyethylene particles charged into a high intensity mixer having a tip speed as high as 42 meters per second. The chemically reactive agent which was used for cross linking was VUL-CUP, an active bisperoxide. This agent is sometimes in a mixture dispersed on an inert filler such as calcium carbonate. The quantity of peroxide is preferred to be in the range of 0.2 to 16% by weight of the resin. The decomposition temperature of VUL-CUP is in the range of 149 to 155 degrees C.

The temperature of the batch in the mixing chamber reached 90 degrees C. and was then discharged. The mixing time for the batch to reach this temperature was in the range of about 8 to 10 seconds.

Table I shows tests of granular LLDPE and LDPE processed in a high intensity mixer with a peroxide cross linking agent. The antioxidant and polyethylene were preblended in a ribbon blender, and the peroxide added voluntarily in a liquid state to each batch.

These polyethylene products containing the cross linking agents were satisfactorily extruded in commercial wire and cable equipment to yield cross linked polyethylene insulated wire exhibiting properties satisfactory for commercial use.

TABLE I

| Product | Batch Weight gms | Blade Tip Speed Meters/Sec. | Time in Mixer Sec.* | Set °C. | Start °C. | Discharge | Pyrometer | Remarks |
|---|---|---|---|---|---|---|---|---|
| Linear low Density Polyethylene | 300 | 24.7 | 24.75 | 78 | | 76 | | Cooled in blender |
| | | | 16.5 | | | | | |
| | | | 24.5 | 78 | 69 | 77 | | |
| 1.1 parts per hundred | | | 19 | 78 | 68 | 75 | | |
| Vul-Cup R* (Cross linking agent) | | | 21.5 | 78 | 68 | 76 | | |
| | | | 22 | 78 | 69 | 77 | 82 | |
| 0.5 parts per hundred IRGANOX 1010** (antioxidant) | | | 23 | 78 | 69 | 76 | 84 | |
| Low Density Polyethylene | 300 | 24.7 | 11 | 80 | 62 | 77 | | Occasional agglomerates appeared due to blade tip |
| 1.1 parts per | 300 | 23.0 | 12 | 78 | 65 | 76 | | speed being too high. |

TABLE I-continued

| Product | Batch Weight gms | Blade Tip Speed Meters/Sec. | Time in Mixer Sec. | Set °C. | Start °C. | Discharge | Pyrometer | Remarks |
|---|---|---|---|---|---|---|---|---|
| hundred Vul-Cup R (cross linking agent) 0.5 parts per hundred IRGANOX 1010 (anti-oxidant) | | | 11 | 78 | 66 | 77 | 84 | Cooled in blender to 33° C. |

*VUL-CUP R is the reactive grade
**IRGANOX 1010 is a trademark of Ciba Giegy

Tests were carried out with the addition of an azo type foaming agent to granular LLDPE and LDPE. Different ratios of foaming agent to the polyethylene were processed. The results are shown in Table II.

TABLE II

| Polyethylene | Azo type Foaming Agent* % by wt. to batch wt. | Batch wt. gms. | Blade Tip Speed meter/Sec. | Time in Mixer Sec. | Set | Start | Discharge | Pyrometer |
|---|---|---|---|---|---|---|---|---|
| Linear low Density Polyethylene | 50% | 250 | 40.8 | 6 | 75 | 61 | 71 | 82 |
| | 50% | 200 | 40.8 | 8 | 75 | | 71 | 88 |
| | 40% | 250 | 40.8 | 7 | 75 | 61 | 72 | 90 |
| | 40% | 250 | 40.8 | 5 | 72 | | | 77 |
| | 40% | 250 | 31.1 | 15 | 72 | 61 | 71 | 81 |
| | 20% | 250 | 40.8 | 5 | 75 | | 71 | 87 |
| | 14.3% | 250 | 40.8 | 4 | 75 | | 71 | 95 |
| Low Density Polyethylene | 50% | 250 | 31.1 | | 90 | | | 91 |
| | 50% | 250 | 31.1 | 18 | 75 | 62 | 72 | 75 |
| | 50% | 250 | 35.9 | 11 | 75 | | 71 | 92 |
| | 50% | 250 | 40.8 | 5 | 75 | | 72 | 89 |
| | 40% | 250 | 31.1 | 17 | 80 | 61 | 76 | 90 |

*Azodicarbonamide type

In one set of tests, the quantity of foaming agent was varied from 6 to 16% by weight of resin. A lubricant and pigment were also added prior to the high intensity mixing step. Both ingredients represented 2% by weight of resin. Sizes of the batches in the high intensity mixer varied from 200 to 250 grams. Batch size is dependent upon the size of the high intensity mixer and either larger or smaller batches may be utilized in different sized mixers.

The resulting polyethylene products with the active foaming agent locked onto them, were satisfactorily extruded giving commercially acceptable form profiles.

The temperature of processing in the high intensity mixer varies dependent upon the flux temperature of the resin and the decomposition temperature of the reactive agent. The key is to lock the chemically reactive agent to the resin particles with the temperature of the batch staying well below the decomposition temperature of the agent and below the fluxing temperature of the resin particles. Cooling following the processing was carried out in a ribbon blender. Agglomeration and caking of the resin particles did not occur after cooling.

Various changes may be made to the embodiments disclosed herein without departing from the scope of the present invention which is limited only by the following claims.

The embodiments of an invention in which an exclusive property or privilege is claimed are defined as follows:

1. A process for incorporating chemically reactive agents on suitable synthetic resins comprising the steps of:
   introducing a batch of finely divided resin particles and chemically reactive agent into an enclosed mixing chamber having a plurality of blades attached to arms rotatable about a central axis within the chamber, the blades having enlarged surfaces relative to the arms to provide paddles for mixing of the resin particles and the reactive agent,
   rotating the blades in the mixing chamber at a blade tip speed of at least 18 meters per second to intensively mix and thermokinetically heat the batch of resin particles and chemically reactive agent,
   continuously monitoring the batch of resin particles and chemically reactive agent so as to maintain the temperature of the batch well below decomposition temperature of the reactive agent and below fluxing temperature of the resin particles,
   continuing the mixing cycle until the chemically reactive agent is locked to the resin particles,
   discharging the batch from the mixing chamber and cooling the discharged batch to avoid agglomeration of the resin particles to provide a product of unagglomerated particles of resin having reactive agent locked to the surface thereof.

2. The process according to claim 1 wherein the discharged batch is cooled in a ribbon blender.

3. The process according to claim 1 wherein the mixing temperature softens the surface of the finely divided resin particles.

4. The process according to claim 1 wherein the synthetic resins are selected from the group consisting of linear and branched low density polyethylene, medium density polyethylene, high density polyethylene, polyethylene copolymers, polypropylene, polypropylene copolymers, polyvinyl chloride, polyvinyl chloride copolymers, polystyrene, acrylics, acrylonitrile butadiene-styrene copolymers, polyvinylidene chloride and polyvinylidene chloride copolymers.

5. The process according to claim 1 wherein the chemically reactive agent is a cross linking agent.

6. The process according to claim 1 wherein the chemically reactive agent is a chemical foaming agent.

7. The process according to claim 1 wherein a combination of reactive agents is used.

8. The process according to claim 1 wherein a single or combination of reactive agents is used with other additives such as lubricants, processing acids and stabilizers.

9. Finely divided synthetic resin particles having a chemically reactive agent locked to the surface of the resin particles, produced according to the process of claim 1.

* * * * *

UNITED STATES PATENT AND TRADEMARK OFFICE
CERTIFICATE OF CORRECTION

PATENT NO. : 4,789,597
DATED : December 6, 1988
INVENTOR(S) : Gupta, et al

It is certified that error appears in the above-identified patent and that said Letters Patent is hereby corrected as shown below:

On the title page, item [73] should read as follows:

--Synergistics Industries Limited, Mississauga, Ontario Canada--.

Signed and Sealed this

Second Day of May, 1989

*Attest:*

DONALD J. QUIGG

*Attesting Officer*  *Commissioner of Patents and Trademarks*